(12) United States Patent
Hussain et al.

(10) Patent No.: US 11,209,116 B1
(45) Date of Patent: Dec. 28, 2021

(54) POLYMER GEO-INJECTION FOR UNDERGROUND PIPELINE PROTECTION

(71) Applicants: Saudi Arabian Oil Company, Dhahran (SA); Overpipe SAS, Meyreuil (FR)

(72) Inventors: Iqbal Hussain, Khobar (SA); Yannick Joubeaux, Saint-Marc-Jaumegarde (FR); Thibault Villette, Dhahran (SA); Waheed Alrafaei, Dhahran (SA)

(73) Assignees: Saudi Arabian Oil Company, Dhahran (SA); Overpipe SAS, Meyreuil (FR)

( * ) Notice: Subject to any disclaimer, the term of this patent is extended or adjusted under 35 U.S.C. 154(b) by 0 days.

(21) Appl. No.: 16/904,366

(22) Filed: Jun. 17, 2020

(51) Int. Cl.
| | | |
|---|---|---|
| *F16L 1/11* | (2006.01) | |
| *F16L 58/10* | (2006.01) | |
| *B29C 63/02* | (2006.01) | |
| *F16L 1/12* | (2006.01) | |
| *F16L 57/00* | (2006.01) | |

(Continued)

(52) U.S. Cl.
CPC ........ *F16L 58/1009* (2013.01); *B29C 63/024* (2013.01); *B29C 63/481* (2013.01); *F16L 1/11* (2013.01); *F16L 1/123* (2013.01); *F16L 57/00* (2013.01); *E02F 5/10* (2013.01)

(58) Field of Classification Search
CPC ........ B29C 63/024; B29C 63/481; E02F 5/10; F16L 1/11; F16L 57/00
See application file for complete search history.

(56) References Cited

U.S. PATENT DOCUMENTS

| | | | | |
|---|---|---|---|---|
| 1,588,897 A | * | 6/1926 | Marston | E02B 13/00 405/258.1 |
| 3,115,861 A | * | 12/1963 | Allen | H02G 9/025 405/157 |

(Continued)

FOREIGN PATENT DOCUMENTS

| | | |
|---|---|---|
| CN | 108980514 A | 12/2018 |
| FR | 3015623 B1 | 8/2016 |

(Continued)

OTHER PUBLICATIONS

International Search Report and Written Opinion in corresponding PCT Application No. PCT/US2021/037755; dated Oct. 26, 2021; 8 pages.

*Primary Examiner* — Benjamin F Fiorello
(74) *Attorney, Agent, or Firm* — Leason Ellis LLP (57) ABSTRACT

A polymer geo-injection apparatus for protecting an underground structure is provided. The apparatus includes: a mechanized vehicle for moving on the ground in order to transport the apparatus while the apparatus forms a subsurface polymer layer that protects the underground structure; a polymer supply tank coupled to the mechanized vehicle and configured to supply solid polymer during the forming of the polymer layer; a polymer melting unit coupled to the mechanized vehicle and configured to receive and melt the supplied solid polymer and to supply the molten polymer during the forming of the polymer layer; and a subsurface ripper coupled to the mechanized vehicle and configured to move through the ground in response to the movement of the mechanized vehicle while receiving and injecting the supplied molten polymer into the ground above the underground structure in order to form the polymer layer and protect the underground structure.

16 Claims, 5 Drawing Sheets

(51) Int. Cl.
*B29C 63/48* (2006.01)
*E02F 5/10* (2006.01)

(56) References Cited

U.S. PATENT DOCUMENTS

| | | | | |
|---|---|---|---|---|
| 3,327,484 | A * | 6/1967 | Launder | E02F 5/101 405/157 |
| 3,339,369 | A * | 9/1967 | Ryan | H02G 1/06 405/157 |
| 3,568,626 | A * | 3/1971 | Southworth, Jr. | H02G 9/025 116/209 |
| 3,604,215 | A * | 9/1971 | Dunn | H02G 1/06 405/155 |
| 3,618,329 | A | 11/1971 | Hanson | |
| 3,664,137 | A * | 5/1972 | Lett | E02F 5/10 405/50 |
| 4,379,655 | A * | 4/1983 | Brost | A01G 25/00 405/176 |
| 4,482,271 | A * | 11/1984 | Mitchell | H02G 9/00 174/98 |
| 4,623,282 | A * | 11/1986 | Allen | F16L 1/11 116/DIG. 14 |
| 4,629,363 | A * | 12/1986 | Rose | E02F 5/101 405/155 |
| 4,714,381 | A * | 12/1987 | Hatch | E02F 5/104 405/175 |
| 4,879,162 | A * | 11/1989 | Hansen, Sr. | B32B 27/32 428/196 |
| 4,988,236 | A * | 1/1991 | Ramsey | F16L 1/11 116/209 |
| 5,303,663 | A | 4/1994 | Salestrom | |
| 6,371,691 | B1 * | 4/2002 | Finzel | G02B 6/4459 37/365 |
| 9,777,881 | B2 | 10/2017 | Wang et al. | |
| 10,900,614 | B1 * | 1/2021 | Villette | F16L 57/00 |
| 10,995,466 | B1 * | 5/2021 | Alrafaei | E21B 4/18 |
| 2002/0085884 | A1* | 7/2002 | Harris | F16L 1/11 405/154.1 |
| 2010/0080656 | A1* | 4/2010 | Palmer | E02D 31/00 405/157 |
| 2013/0011198 | A1* | 1/2013 | Pichler | E02F 5/101 405/157 |
| 2013/0209172 | A1* | 8/2013 | Smucker | A01G 29/00 405/38 |
| 2013/0228287 | A1* | 9/2013 | Bessette | E04D 15/04 156/499 |
| 2019/0226603 | A1* | 7/2019 | Pino, Jr. | E02F 9/245 |
| 2021/0123209 | A1* | 4/2021 | Villette | D03D 7/00 |

FOREIGN PATENT DOCUMENTS

| | | |
|---|---|---|
| JP | 2019027134 A | 2/2019 |
| KR | 101391127 B1 | 5/2014 |
| RU | 60166 U1 | 1/2007 |

* cited by examiner

Start
↓

Transport polymer geo-injection apparatus by moving mechanized vehicle of apparatus on ground
510
— Mechanized Vehicle 110
↓

Form subsurface polymer layer that protects underground structure while mechanized vehicle transports apparatus
520
— Polymer Geo-Injection Apparatus 100, 300
↓

Supply solid polymer
530
— Polymer Tank 120
↓

Supply perforated polymer sheathing
540
— Sheathing Spool 360
↓

Receive and melt supplied solid polymer and supply molten polymer
550
— Polymer Melting Unit 130
↓

Move subsurface ripper through ground in response to movement of mechanized vehicle while receiving and injecting supplied molten polymer into ground above underground structure
560
— Mechanized Vehicle 110 Subsurface Ripper 140
↓

Receive and eject supplied polymer sheathing into ground while injecting molten polymer; ejected polymer sheathing serves as barrier between ground and molten polymer
570
— Subsurface Ripper 140
↓

End

POLYMER GEO-INJECTION FOR UNDERGROUND PIPELINE PROTECTION

FIELD OF THE DISCLOSURE

The present disclosure relates generally to protecting underground assets, such as pipelines, and specifically to techniques of polymer geo-injection for protecting such assets.

BACKGROUND OF THE DISCLOSURE

The security and safety around underground structures such as oil and gas transportation pipelines is an important endeavor. Third party accidents that damage such pipelines, such as from equipment (like excavators) operating in the vicinity of existing pipelines, are frequent, oftentimes because the pipelines are insufficiently spotted or insufficiently protected. Increasing urbanization of pipeline corridors further increases the number of such accidents.

It is in regard to these and other problems in the art that the present disclosure is directed to provide a technical solution for effective techniques of polymer geo-injection to protect buried and subsurface structures from above-ground impact damage.

SUMMARY OF THE DISCLOSURE

According to a first aspect of the disclosure, a polymer geo-injection apparatus for protecting an underground structure is provided in one embodiment. The apparatus comprises: a mechanized vehicle for moving on the ground in order to transport the apparatus while the apparatus forms a subsurface polymer layer that protects the underground structure; a polymer supply tank coupled to the mechanized vehicle and configured to supply solid polymer during the forming of the polymer layer; a polymer melting unit coupled to the mechanized vehicle and configured to receive and melt the supplied solid polymer and to supply the molten polymer during the forming of the polymer layer; and a subsurface ripper coupled to the mechanized vehicle and configured to move through the ground in response to the movement of the mechanized vehicle while receiving and injecting the supplied molten polymer into the ground above the underground structure in order to form the polymer layer and protect the underground structure.

In an embodiment consistent with the above, the apparatus further comprises: a spool of perforated polymer sheathing coupled to the mechanized vehicle and configured to supply the perforated polymer sheathing to the subsurface ripper during the forming of the polymer layer, wherein the subsurface ripper is further configured to receive and eject the supplied polymer sheathing into the ground while injecting the molten polymer, the ejected polymer sheathing serving as a barrier between the ground and the injected molten polymer.

In an embodiment consistent with the above, the apparatus further comprises: an air compressor and a compressed air tank coupled to the mechanized vehicle and configured to compress air, store the compressed air, and supply the stored compressed air to the subsurface ripper during the forming of the polymer layer, wherein the subsurface ripper is further configured to receive and inject the supplied compressed air into the ground in order to form cavities in which to inject the supplied molten polymer during the forming of the polymer layer.

In an embodiment consistent with the above, the apparatus further comprises an electronic inspection device coupled to the mechanized vehicle or the subsurface ripper and configured to inspect at least one of a shape and a thickness of the polymer layer during the forming of the polymer layer.

In an embodiment consistent with the above, the subsurface ripper comprises: a ripper arm coupled to the mechanized vehicle and configured to serve as a vertical conduit for the supplied molten polymer from above ground to a formation depth below ground of the polymer layer; and a ripper blade coupled to the ripper arm at the formation depth and configured to serve as a horizontal conduit for injecting the supplied molten polymer into the ground in order to form the polymer layer.

In an embodiment consistent with the above, the ripper blade is available or configurable in multiple widths or thicknesses in order to inject the supplied molten polymer into the ground to form the polymer layer having a desired width or thickness.

In an embodiment consistent with the above, the subsurface ripper is further configured to form the polymer layer in separated slabs having a desired length and separation.

In an embodiment consistent with the above, the solid polymer comprises high-density polyethylene (HDPE) beads.

According to another aspect of the disclosure, a method of polymer geo-injection for protecting an underground structure is provided. The method comprises: transporting a polymer geo-injection apparatus by moving a mechanized vehicle of the apparatus on the ground; and forming, by the apparatus, a subsurface polymer layer that protects the underground structure while the mechanized vehicle transports the apparatus. Forming the polymer layer comprises: supplying solid polymer from a polymer supply tank coupled to the mechanized vehicle; receiving and melting the supplied solid polymer and supplying the molten polymer using a polymer melting unit coupled to the mechanized vehicle; and moving a subsurface ripper through the ground in response to the movement of the mechanized vehicle while receiving and injecting the supplied molten polymer into the ground above the underground structure to protect the underground structure, wherein the subsurface ripper is coupled to the mechanized vehicle.

In an embodiment consistent with the method described above, forming the polymer layer further comprises: supplying perforated polymer sheathing to the subsurface ripper from a spool of perforated polymer sheathing coupled to the mechanized vehicle; and receiving and ejecting, by the subsurface ripper, the supplied polymer sheathing into the ground while injecting the molten polymer, the ejected polymer sheathing serving as a barrier between the ground and the injected molten polymer.

In an embodiment consistent with the method described above, forming the polymer layer further comprises: compressing air, storing the compressed air, and supplying the stored compressed air to the subsurface ripper using an air compressor and a compressed air tank coupled to the mechanized vehicle; and receiving and injecting, by the subsurface ripper, the supplied compressed air into the ground in order to form cavities in which to inject the supplied molten polymer.

In an embodiment consistent with the method described above, forming the polymer layer further comprises inspecting at least one of a shape and a thickness of the polymer layer using an electronic inspection device coupled to the mechanized vehicle or the subsurface ripper.

In an embodiment consistent with the method described above, forming the polymer layer further comprises: using a ripper arm of the subsurface ripper as a vertical conduit for the supplied molten polymer from above ground to a formation depth below ground of the polymer layer; and using a ripper blade of the subsurface ripper coupled to the ripper arm at the formation depth as a horizontal conduit for injecting the supplied molten polymer into the ground.

In an embodiment consistent with the method described above, the ripper blade is available or configurable in multiple widths or thicknesses in order to inject the supplied molten polymer into the ground to form the polymer layer having a desired width or thickness.

In an embodiment consistent with the method described above, forming the polymer layer further comprises forming, by the subsurface ripper, the polymer layer in separated slabs having a desired length and separation.

In an embodiment consistent with the method described above, the solid polymer comprises high-density polyethylene (HDPE) beads.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

In various example embodiments, techniques based on polymer geo-injection for the installation of subsurface polymer layers for underground pipeline protection against third party damage are provided. Example methods and apparatuses of polymer geo-injection using a subsurface delivery system eliminate the need to trench, remove soil or earth, and backfill the trenches, which significantly reduces costs to protect buried assets, such as pipes, pipelines, and storage vessels or other underground infrastructure. Such techniques allow localized manufacturing of pipeline protection systems against third party damage and prevent the need to order and transport protective systems to the site. In addition, such techniques allow efficiency and speed of subsurface pipeline protection deployment and completion. Further, such techniques provide for multiple subsurface attachments to allow for adequate or desired polymer layer coverage depending on, for example, the size of the pipeline to be protected. Such techniques also provide for the deposition of molten polymer below the surface, forming an impact resistant barrier above the pipeline to be protected. Such techniques can additionally include the deployment of subsurface pocket(s) or sheathing to contain the injected polymer, which can prevent the mixing of polymer and soil or earth when forming the subsurface polymer layers.

As discussed earlier, there are a number of problems associated with protecting underground structures from above-ground impact damage. While trenching and back-filling can be used to install protective structures, such as concrete slabs, above the pipelines, this can be an expensive and invasive procedure, requiring significant amounts of heavy equipment (e.g., cranes, trucks) and personnel. Concrete is also challenging to move in case of necessary maintenance operations. Prefabricated polymer slabs (e.g., high-density polyethylene or HDPE) can be used in lieu of concrete slabs to provide similar protection and with less weight, but they still require trenching and back filling to install over existing pipelines. While polymer meshes are significantly lighter than either concrete or polymer slabs, they provide less protection, and to provide even adequate protection from polymer meshes requires more surface area coverage than with slabs, which leads to more (e.g., wider) trenching and back filling than with slabs.

Accordingly, in example embodiments, polymer geo-injection is used to lay or deposit a continuous (e.g., layer) or semi-continuous (e.g., slab) polymer-based protective covering above the subsurface pipeline or underground asset without the need for trenching and back-filling. Such techniques provide an impact-resistant barrier between the buried pipeline and potential above-ground third party interference due to, for example, mechanical excavation or diggers. The delivery of the molten polymer from above the surface solidifies below the surface and above the pipeline to form an impact resistant barrier between the pipeline and potential impact damage from above ground. Such techniques allow for the protection of buried structures from above-ground impact damage without the need for trenching and back-filling, which results in significant cost savings. In addition, such techniques can be delivered continuously or semi-continuously at a given thickness, density, and width, which allows for flexibility depending on, for example, the length and width of the structure to be protected. Further, the delivered polymer can be kept separate from mixing with surrounding soil or earth by sheathing or encasing the molten polymer in a protective wrapping which is also delivered below the surface concurrently (e.g., simultaneously) with the polymer, or just ahead of delivery of the polymer. There is also minimal disruption to existing cathodic protection systems using such techniques.

According to various embodiments, an apparatus for subsurface delivery, a method of subsurface delivery, and a subsurface protection system are provided. These techniques protect existing buried assets such as pipelines, optic cables, or any existing valuable buried asset, against above-ground third party damage such as that caused accidentally by an excavator. The apparatus is an electromechanical system for the subsurface delivery of molten polymer without the need for trenching and back-filling. Upon delivery through a subsurface soil ripper (more generally, a "ripper"), the molten polymer hardens and solidifies to create an impact-resistant barrier between the pipeline (or any other buried asset) and any potential accidental impact from above-ground, e.g., by a mechanical excavator or digging. Example apparatuses will now be described with reference to FIGS. 1-4.

Figure 1:
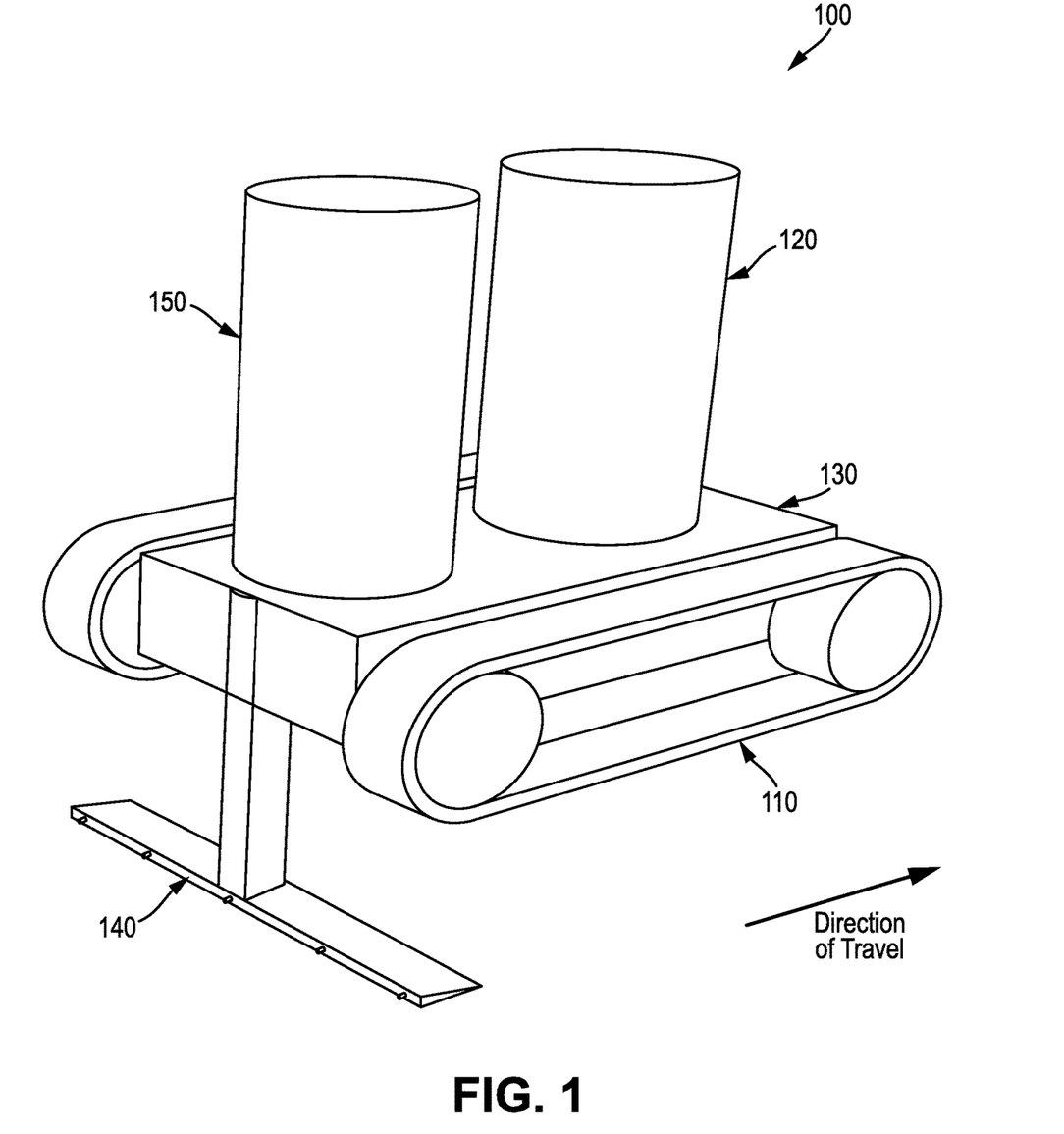
FIG. 1 is an illustration of an example polymer geo-injection apparatus, according to an embodiment.
Figure 2:
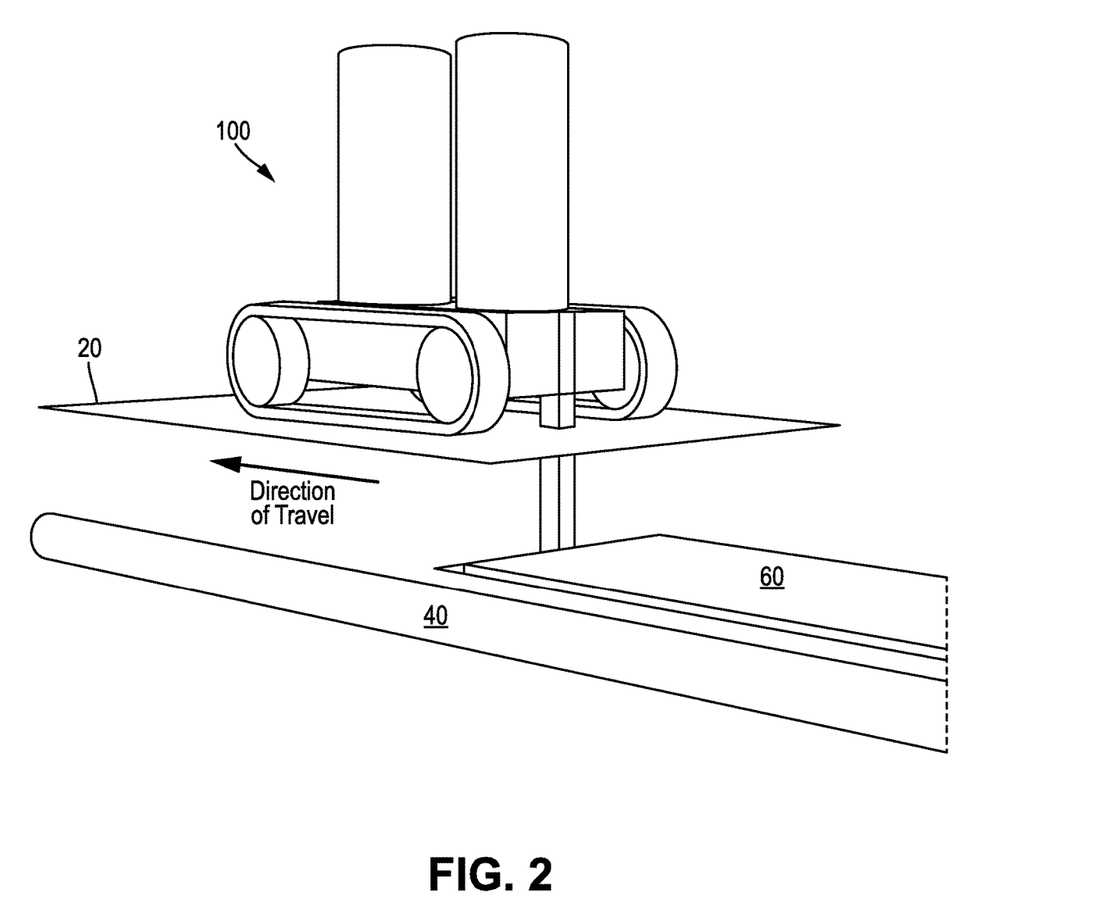
FIGS. 2-3 are illustrations of the polymer geo-injection apparatus of FIG. 1 in example deployments, injecting molten polymer below ground to form a subsurface polymer layer that protects an underground pipe, according to embodiments.
Figure 3:
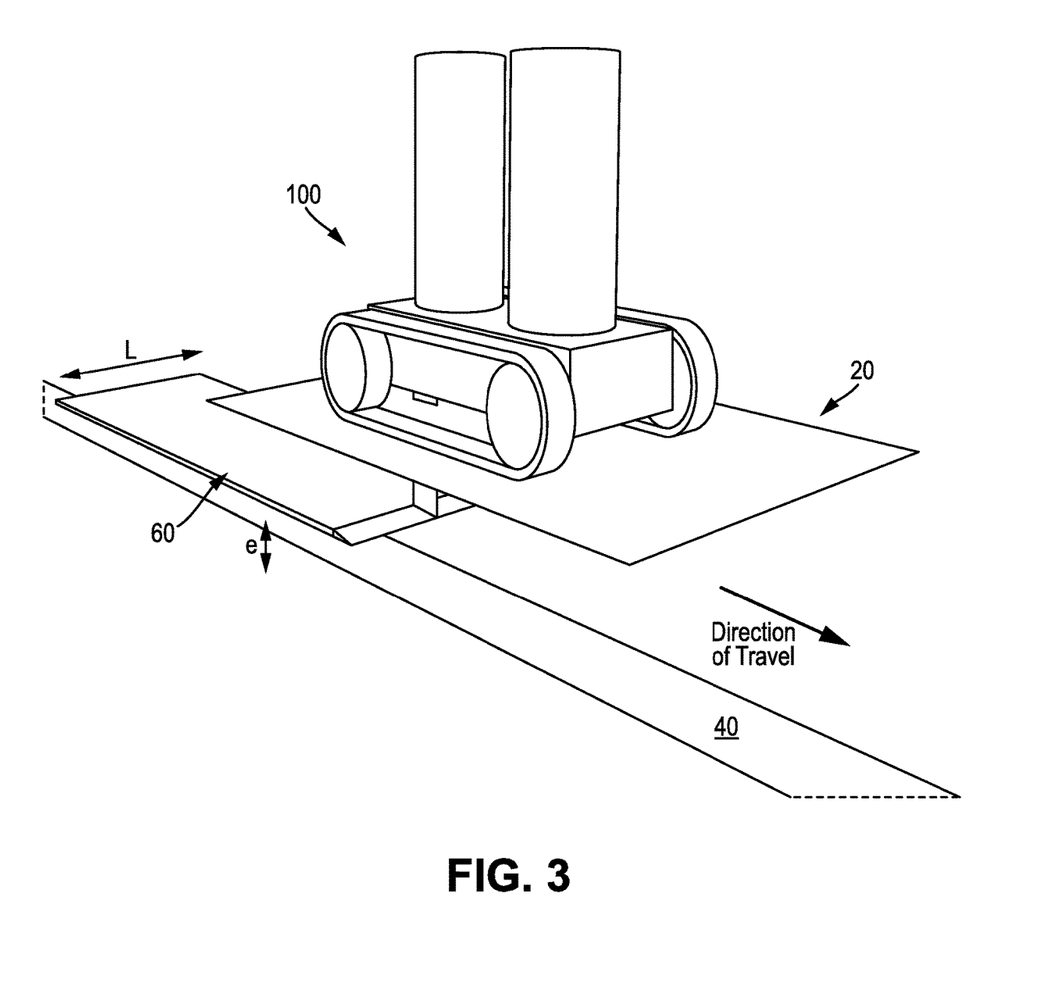
Figure 4:
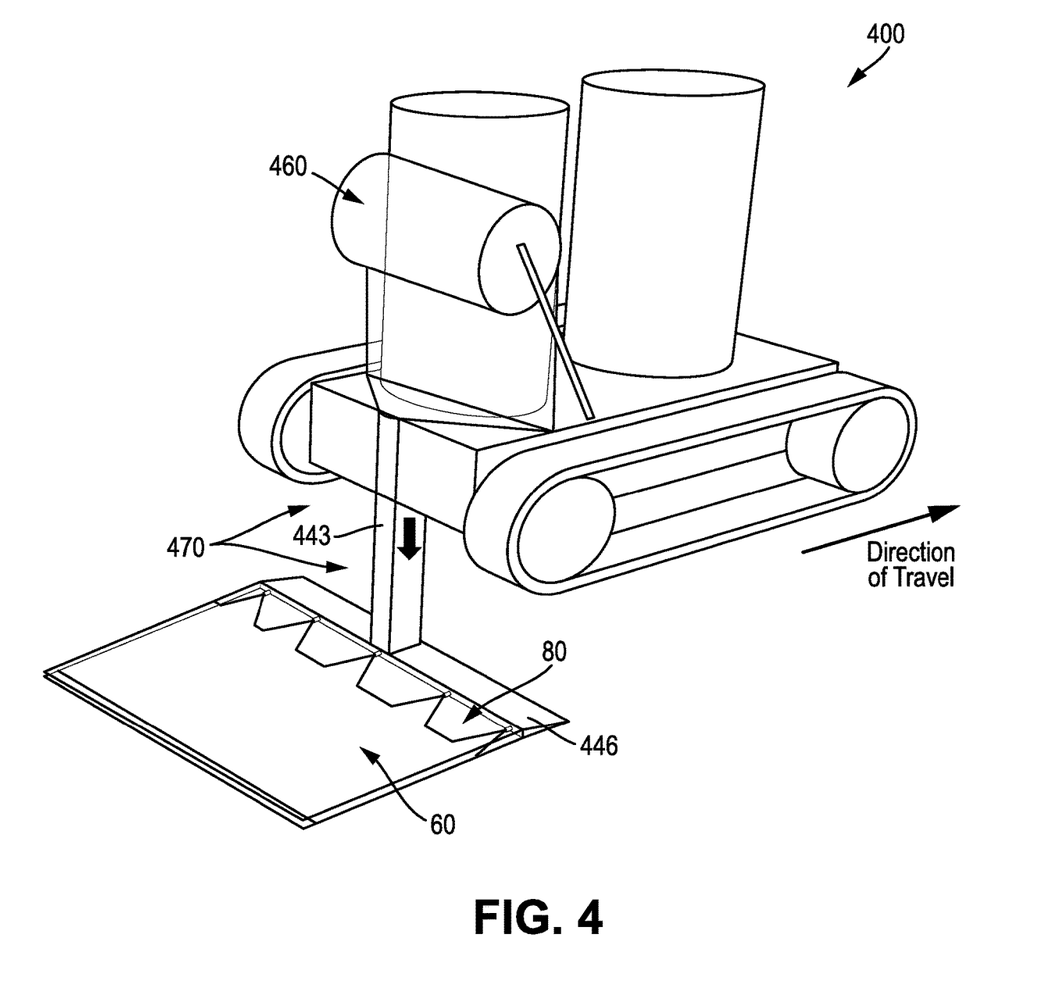
FIG. 4 is an illustration of an example polymer geo-injection apparatus with polymer sheathing, according to an embodiment.

FIG. 1 is an illustration of an example polymer geo-injection apparatus 100, according to an embodiment. FIGS. 2-3 are illustrations of the polymer geo-injection apparatus 100 of FIG. 1 in example deployments, injecting molten polymer below ground 20 to form a subsurface polymer layer 60 that protects an underground hydrocarbon pipe 40 (e.g., for transporting oil, natural gas, or other petrochemical products), according to embodiments. FIG. 4 is an illustration of an example polymer geo-injection apparatus 400 with polymer sheathing 460, according to an embodiment. For ease of description, the apparatus 400 of FIG. 4 is similar to the apparatus 100 of FIG. 1 and as such, only differences with FIG. 1, or shared features that are unidentified in FIG. 1, are identified or discussed in FIG. 4. FIGS. 1 and 4 show the basic concepts of the polymer geo-injection apparatuses 100 and 400, while FIGS. 2-3 illustrate the apparatus 100 in operation. The apparatuses 100 and 400 have a front on the right side of FIGS. 1 and 4, and a back on the left side of FIGS. 1 and 4. The apparatuses 100 and 400 move in the direction of the front (as marked in FIGS. 1-4), with most of the structure of apparatuses 100 and 400 being above the ground 20 during deployment of the subsurface polymer layer 60 to cover pipe 40.

Referring to FIG. 1, the apparatus 100 includes the following components: a mechanized vehicle 110 (e.g., truck, earth-moving vehicle with treads, or the like) to transport the apparatus 100, which makes the apparatus 100 fully mobile; several tanks that contain compressed air (e.g., compressed air tank 150) and raw polymer beads or feedstock (e.g., polymer tank 120); an air compressor (e.g., to compress air and store the compressed air in compressed air tank 150 for pneumatic injection); a polymer melting unit 130 to melt the polymer beads (e.g., HDPE beads) or feedstock; hoses, tubes, pipes, or other conduits connecting the tanks and compressor to a subsurface ripper 140 and to feed the ripper 140 with compressed air or molten polymer; and a portable electronic inspection device (see electronic inspection device 470 of FIG. 4) to inspect the final shape and thickness of the protection slab. For example, the electronic inspection device can be an infrared (IR) or thermal imaging camera mounted to the subsurface ripper 140 or a ground-penetrating radar (GPR) mounted to the mechanized vehicle 110.

FIGS. 2-3 illustrate example polymer geo-injection concepts in action with compressed air at a pressure being injected (e.g., pneumatic injection) through the subsurface ripper into the earth 20 which is sufficient to loosen the earth or soil (such as in a light sand or other porous medium) in order to create a cavity (or cavities) in the earth or soil. The pressure can be adjusted to meet the demands of the particular ground material in which the polymer is to be injected.

The molten polymer is injected immediately after through nozzles also in the subsurface ripper at a width and thickness defined by the dimensions of the subsurface ripper blade (see, e.g., ripper blade 446 in FIG. 4). In some embodiments, the ripper blade cuts through the earth 20 and creates a cavity without the need for compressed air. In FIG. 3, the polymer is being injected at predefined dimensions (e.g., width, length, and thickness) to create a desired polymer layer 60. The injected polymer is heated to a generally fluid state. Optionally, the polymer is heated beyond the melting point in order to initially remain molten despite contact with unheated ground material. The melting point can vary significantly with the type of polymer. For instance, the melting point can lie in a temperature range that is between 120 degrees Celsius (° C.) and 260° C., which covers low melting point polymers such as polyethylene (PE) up to high melting point polymers such as polyethylene terephtalate (PET).

The apparatus 400 shown in FIG. 4 is similar to the apparatus 100 of FIG. 1 except for the sheathing or cover roller 460 situated above-ground on top of the mechanized vehicle and adjacent to the polymer and compressed air tanks. The apparatus 400 allows for the deposition of the molten polymer to be segregated from the soil or earth, which can preserve the properties of the polymer. While the mixing of polymer with soil or sand can reinforce or strengthen the polymer, the apparatus 400 allows the complete segregation of the polymer and soil. For example, certain soils may exhibit undesirable characteristics adversely affecting the polymer. The protective sheathing or cover is made from polymer and is perforated to allow air to escape in order to prevent air build-up within the deposited or injected bulk polymer. The perforations are such that air is allowed to escape but not the molten polymer as it is more viscous.

In further detail, the apparatus 400 includes the following components: a mechanized vehicle to transport the whole apparatus 400, which make the apparatus 400 fully mobile; several tanks that contain compressed air and raw polymer beads or feedstock; an air compressor; a polymer melting unit to melt the polymer beads or feedstock; hoses connecting the tanks and compressor to the subsurface ripper in order to feed the ripper with compressed air or molten polymer; a roll 460 of perforated protective polymer sheathing or cover that is ejected through the subsurface ripper at the same time as the injected bulk molten polymer; and a portable electronic inspection device to inspect the final shape and thickness of the protection slab.

With reference to FIGS. 1-4, in some example embodiments, a polymer geo-injection apparatus (such as polymer geo-injection apparatus 100 or 400) for protecting an underground structure (such as hydrocarbon pipe 40) is provided. The apparatus includes a mechanized vehicle (such as mechanized vehicle 110) that moves on the ground (such as ground 20) in order to transport the apparatus while the apparatus forms a subsurface polymer layer (such as polymer layer 60) that protects the underground structure. The apparatus further includes a polymer supply tank (such as polymer tank 120) coupled to the mechanized vehicle and that supplies solid polymer (such as HDPE beads) during the forming of the polymer layer. In addition, the apparatus includes a polymer melting unit (such as polymer melting unit 130) coupled to the mechanized vehicle and that receives and melts the supplied solid polymer and supplies the molten polymer during the forming of the polymer layer. The apparatus also includes a subsurface ripper (such as subsurface ripper 140) coupled to the mechanized vehicle and that moves through the ground in response to the movement of the mechanized vehicle while receiving and injecting the supplied molten polymer into the ground above the underground structure in order to form the polymer layer.

In some embodiments, such as the apparatus 400 of FIG. 4, the apparatus further includes a spool (such as spool 460) of perforated polymer sheathing coupled to the mechanized vehicle and that supplies the perforated polymer sheathing to the subsurface ripper during the forming of the polymer layer. Here, the subsurface ripper receives and ejects the supplied polymer sheathing into the ground while injecting the molten polymer, the ejected polymer sheathing serving as a barrier between the ground and the injected molten polymer. In some embodiments, the apparatus further includes an air compressor and a compressed air tank (such as compressed air tank 150) coupled to the mechanized vehicle and configured to compress air, store the compressed air, and supply the stored compressed air to the subsurface ripper during the forming of the polymer layer. Here, the subsurface ripper receives and injects the supplied compressed air into the ground in order to form cavities in which to inject the supplied molten polymer during the forming of the polymer layer.

In some embodiments, the apparatus further includes an electronic inspection device (such as electronic inspective device 470) coupled to the mechanized vehicle (e.g., a GPR) or the subsurface ripper (e.g., an IR camera) and that inspects at least one of a shape and a thickness of the polymer layer during the forming of the polymer layer. In some embodiments, the subsurface ripper includes a ripper arm (such as ripper arm 443) coupled to the mechanized vehicle and that serves as a vertical conduit for the supplied molten polymer from above ground to a formation depth below ground of the polymer layer. The subsurface ripper also includes a ripper blade (such as ripper blade 446) coupled to the ripper arm at the formation depth and that serves as a horizontal conduit for injecting the supplied molten polymer into the ground in order to form the polymer layer. In some such embodiments, the ripper blade is available or configurable in multiple widths or thicknesses in order to inject the supplied molten polymer into the ground to form the polymer layer having a desired width or thickness.

In some embodiments, the subsurface ripper is further configured to form the polymer layer in separated slabs having a desired length and separation (such as equally spaced slabs of the same size). In some embodiments, the solid polymer includes high-density polyethylene (HDPE) beads from which to form the molten polymer. These and other embodiments provide for cost effective nonmetallic protection against third party damage for subsurface infrastructures. Such embodiments allow for the protection of buried assets (e.g., pipelines) against above-surface impact damage. Such embodiments also allow for the deposition of molten polymer below the surface without the need for trenching and back-filling.

In example embodiments, polymer geo-injection techniques are provided to form subsurface polymer protection layers for which it is not necessary to dig trenches and back fill them, as opposed to comparable concrete and polymer slab technologies. This results in increased cost savings and time savings, while providing equivalent pipeline protection and encroachment risk mitigation. Such embodiments protect buried pipelines and other buried assets and infrastructure from above-ground impact damage. Such embodiments provide pipeline protection by forming polymer (e.g., HDPE) layers over buried pipelines using subsurface delivery techniques, and without the trenching, back filling, and heavy lifting of using concrete slabs. Such embodiments also provide trenchless solutions for the protection of valuable existing buried infrastructure.

The described techniques herein can be implemented using a combination of sensors, cameras, GPRs, and other devices including computing or other logic circuits configured (e.g., programmed) to carry out their assigned tasks. These devices are located on or in (or otherwise in close proximity to) the mechanized vehicle or processing circuitry for carrying out the techniques. In some example embodiments, the control logic is implemented as computer code configured to be executed on a computing circuit (such as a microprocessor) to perform the control steps that are part of the technique.

Figure 5:
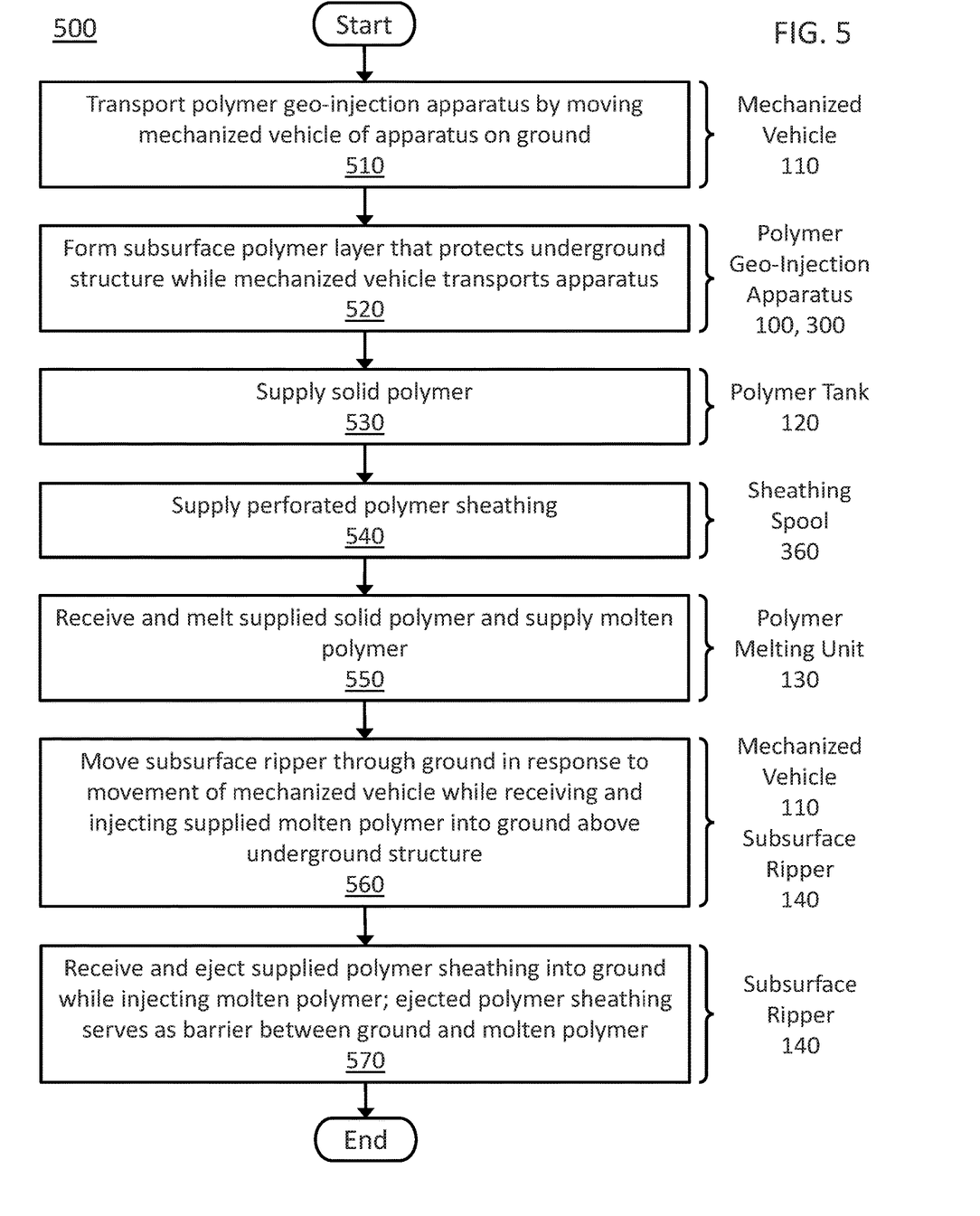
FIG. 5 is a flow diagram of an example method of polymer geo-injection for protecting an underground structure using a polymer geo-injection apparatus, according to an embodiment.

FIG. 5 is a flow diagram of an example method 500 of polymer geo-injection for protecting an underground structure (such as pipe 40) using a polymer geo-injection apparatus (such as polymer geo-injection apparatus 100 or 400), according to an embodiment.

Some or all of the method 500 can be performed using components and techniques illustrated in FIGS. 1 through 4. In addition, portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a single board computer (SBC), a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 500 (or other disclosed method) to be carried out. It should be noted that in other embodiments, the order of the operations can be varied, and that some of the operations can be omitted. Some of the method 500 can also be performed using logic, circuits, or processors located on or in electrical communication with a processing circuit configured to carry out the method 500.

In the method 500, processing begins with the step of transporting 510 a polymer geo-injection apparatus (such as polymer geo-injection apparatus 100 or 400) by moving a mechanized vehicle (such as mechanized vehicle 110) of the apparatus on the ground (such as ground 20). The method 500 further includes the step of forming 520, by the apparatus, a subsurface polymer layer (such as polymer layer 60) that protects the underground structure (such as pipe 40) while the mechanized vehicle transports the apparatus. Here, the step of forming 520 the polymer layer includes the sub-steps of supplying 530 solid polymer (such as HDPE beads) from a polymer supply tank (such as polymer supply tank 120) coupled to the mechanized vehicle, and supplying 540 perforated polymer sheathing (such as a fine polymer mesh) from a spool of perforated polymer sheathing (such as perforated polymer sheathing spool 460) coupled to the mechanized vehicle. The step of forming 520 the polymer layer further includes the sub-step of receiving 550 and melting the supplied solid polymer and supplying the molten polymer using a polymer melting unit (such as polymer melting unit 130) coupled to the mechanized vehicle.

In addition, the step of forming 520 the polymer layer includes the compound sub-step of moving 560 a subsurface ripper (such as subsurface ripper 140) through the ground in response to the movement of the mechanized vehicle (such as by being tightly coupled to the mechanized vehicle) while receiving and injecting the supplied molten polymer into the ground above the underground structure. Here, the subsurface ripper is coupled to the mechanized vehicle. The step of forming 520 the polymer layer further includes the sub-step of receiving 570 and ejecting, by the subsurface ripper, the supplied polymer sheathing into the ground while injecting the molten polymer. Here, the ejected polymer sheathing serves as a barrier between the ground and the injected molten polymer (such as to prevent the ground from mixing with the injected molten polymer) while allowing any air enclosed in the sheathing to escape (e.g., through the perforations) if displaced by the molten polymer.

In an example embodiment, in the method 500, the step of forming 520 the polymer layer further includes the sub-step of compressing air, storing the compressed air, and supplying the stored compressed air to the subsurface ripper using an air compressor and a compressed air tank (such as compressed air tank 150) coupled to the mechanized vehicle. In addition, the step of forming 520 the polymer layer includes the sub-step of receiving and injecting, by the subsurface ripper, the supplied compressed air into the ground in order to form cavities in which to inject the supplied molten polymer.

In an example embodiment, in the method 500, the step of forming 520 the polymer layer further includes the sub-step of inspecting at least one of a shape (e.g., length and width) and a thickness of the polymer layer using an electronic inspection device (such as electronic inspection device 470) coupled to the mechanized vehicle (e.g., a GPR) or the subsurface ripper (e.g., an IR or thermal imaging camera).

In an example embodiment, in the method 500, the step of forming 520 the polymer layer further includes the sub-steps of using a ripper arm (such as ripper arm 443) of the subsurface ripper as a vertical conduit for the supplied molten polymer from above ground to a formation depth below ground of the polymer layer, and using a ripper blade (such as ripper blade 446) of the subsurface ripper coupled to the ripper arm at the formation depth as a horizontal conduit for injecting the supplied molten polymer into the ground.

In an example embodiment, the ripper blade is available or configurable in multiple widths or thicknesses in order to inject the supplied molten polymer into the ground to form the polymer layer having a desired width or thickness. In another example embodiment, in the method 500, the step of forming 520 the polymer layer further includes the sub-step of forming, by the subsurface ripper, the polymer layer in separated slabs having a desired length and separation. In yet another example embodiment, the solid polymer includes high-density polyethylene (HDPE) beads.

The methods described herein may be performed in part by software or firmware in machine readable form on a tangible (e.g., non-transitory) storage medium. For example, the software or firmware may be in the form of a computer program including computer program code adapted to perform some of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A polymer geo-injection apparatus for protecting an underground structure, comprising:
    a mechanized vehicle for moving on the ground in order to transport the apparatus while the apparatus forms a subsurface polymer layer that protects the underground structure;
    a polymer supply tank coupled to the mechanized vehicle and configured to supply solid polymer during the forming of the polymer layer;
    a polymer melting unit coupled to the mechanized vehicle and configured to receive and melt the supplied solid polymer and to supply the molten polymer during the forming of the polymer layer; and
    a subsurface ripper coupled to the mechanized vehicle and configured to move through the ground in response to the movement of the mechanized vehicle while receiving and injecting the supplied molten polymer into the ground above the underground structure in order to form the polymer layer and protect the underground structure.

2. The apparatus of claim 1, further comprising:
    a spool of perforated polymer sheathing coupled to the mechanized vehicle and configured to supply the perforated polymer sheathing to the subsurface ripper during the forming of the polymer layer,
    wherein the subsurface ripper is further configured to receive and eject the supplied polymer sheathing into the ground while injecting the molten polymer, the ejected polymer sheathing serving as a barrier between the ground and the injected molten polymer.

3. The apparatus of claim 1, further comprising:
    an air compressor and a compressed air tank coupled to the mechanized vehicle and configured to compress air, store the compressed air, and supply the stored compressed air to the subsurface ripper during the forming of the polymer layer, wherein the subsurface ripper is further configured to receive and inject the supplied compressed air into the ground in order to form cavities in which to inject the supplied molten polymer during the forming of the polymer layer.

4. The apparatus of claim 1, further comprising an electronic inspection device coupled to the mechanized vehicle or the subsurface ripper and configured to inspect at least one of a shape and a thickness of the polymer layer during the forming of the polymer layer.

5. The apparatus of claim 1, wherein the subsurface ripper comprises:
   a ripper arm coupled to the mechanized vehicle and configured to serve as a vertical conduit for the supplied molten polymer from above ground to a formation depth below ground of the polymer layer; and
   a ripper blade coupled to the ripper arm at the formation depth and configured to serve as a horizontal conduit for injecting the supplied molten polymer into the ground in order to form the polymer layer.

6. The apparatus of claim 5, wherein the ripper blade is available or configurable in multiple widths or thicknesses in order to inject the supplied molten polymer into the ground to form the polymer layer having a desired width or thickness.

7. The apparatus of claim 1, wherein the subsurface ripper is further configured to form the polymer layer in separated slabs having a desired length and separation.

8. The apparatus of claim 1, wherein the solid polymer comprises high-density polyethylene (HDPE) beads.

9. A method of polymer geo-injection for protecting an underground structure, the method comprising:
   transporting a polymer geo-injection apparatus by moving a mechanized vehicle of the apparatus on the ground; and
   forming, by the apparatus, a subsurface polymer layer that protects the underground structure while the mechanized vehicle transports the apparatus, wherein forming the polymer layer comprises:
   supplying solid polymer from a polymer supply tank coupled to the mechanized vehicle;
   receiving and melting the supplied solid polymer and supplying the molten polymer using a polymer melting unit coupled to the mechanized vehicle; and
   moving a subsurface ripper through the ground in response to the movement of the mechanized vehicle while receiving and injecting the supplied molten polymer into the ground above the underground structure to protect the underground structure,
   wherein the subsurface ripper is coupled to the mechanized vehicle.

10. The method of claim 9, wherein forming the polymer layer further comprises:
   supplying perforated polymer sheathing to the subsurface ripper from a spool of perforated polymer sheathing coupled to the mechanized vehicle; and
   receiving and ejecting, by the subsurface ripper, the supplied polymer sheathing into the ground while injecting the molten polymer, the ejected polymer sheathing serving as a barrier between the ground and the injected molten polymer.

11. The method of claim 9, wherein forming the polymer layer further comprises:
   compressing air, storing the compressed air, and supplying the stored compressed air to the subsurface ripper using an air compressor and a compressed air tank coupled to the mechanized vehicle; and
   receiving and injecting, by the subsurface ripper, the supplied compressed air into the ground in order to form cavities in which to inject the supplied molten polymer.

12. The method of claim 9, wherein forming the polymer layer further comprises inspecting at least one of a shape and a thickness of the polymer layer using an electronic inspection device coupled to the mechanized vehicle or the subsurface ripper.

13. The method of claim 9, wherein forming the polymer layer further comprises:
   using a ripper arm of the subsurface ripper as a vertical conduit for the supplied molten polymer from above ground to a formation depth below ground of the polymer layer; and
   using a ripper blade of the subsurface ripper coupled to the ripper arm at the formation depth as a horizontal conduit for injecting the supplied molten polymer into the ground.

14. The method of claim 13, wherein the ripper blade is available or configurable in multiple widths or thicknesses in order to inject the supplied molten polymer into the ground to form the polymer layer having a desired width or thickness.

15. The method of claim 9, wherein forming the polymer layer further comprises forming, by the subsurface ripper, the polymer layer in separated slabs having a desired length and separation.

16. The method of claim 9, wherein the solid polymer comprises high-density polyethylene (HDPE) beads.

* * * * *